US012791809B2

(12) United States Patent
Sato et al.

(10) Patent No.: US 12,791,809 B2
(45) Date of Patent: Nov. 10, 2026

(54) OPTICAL FIBER ASSEMBLY AND OPTICAL CABLE

(71) Applicant: Fujikura Ltd., Tokyo (JP)

(72) Inventors: Hironori Sato, Sakura (JP); Itaru Ishida, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 294 days.

(21) Appl. No.: 18/724,327

(22) PCT Filed: Dec. 15, 2022

(86) PCT No.: PCT/JP2022/046215
§ 371 (c)(1),
(2) Date: Jun. 26, 2024

(87) PCT Pub. No.: WO2023/127524
PCT Pub. Date: Jul. 6, 2023

(65) Prior Publication Data

US 2025/0067947 A1 Feb. 27, 2025

(30) Foreign Application Priority Data

Dec. 27, 2021 (JP) ................................ 2021-212141

(51) Int. Cl.
*G02B 6/44* (2006.01)

(52) U.S. Cl.
CPC ................................. *G02B 6/4403* (2013.01)

(58) Field of Classification Search
None
See application file for complete search history.

(56) References Cited

U.S. PATENT DOCUMENTS 4,496,214 A 1/1985 Oestreich et al.
4,984,859 A * 1/1991 Fujigaki ............... G02B 6/4471 385/115

(Continued)

FOREIGN PATENT DOCUMENTS

CN 107209337 A 9/2017
CN 107340577 A 11/2017

(Continued)

OTHER PUBLICATIONS

International Search Report issued in corresponding International Application No. PCT/JP2022/046215 mailed Feb. 21, 2023 (3 pages).

(Continued)

*Primary Examiner* — Andrew Jordan
(74) *Attorney, Agent, or Firm* — Osha Bergman Watanabe & Burton LLP

(57) ABSTRACT

An optical fiber assembly includes: bundled optical fiber units, each of which is configured by stacking optical fiber ribbons. A stacked state of the optical fiber ribbons in an optical fiber unit of the bundled optical fiber units is collapsed such that a ribbon surface of at least one of the optical fiber ribbons configuring the optical fiber unit is bent, in a cross section of the optical fiber assembly orthogonal to a longitudinal direction of the optical fiber assembly at least at a first position in the longitudinal direction. The bundled optical fiber units include inner layer fiber units located on an inner side in a radial direction of the optical fiber assembly, and outer layer fiber units located on an outer side in the radial direction of the optical fiber assembly relative to the inner layer fiber units, in a cross section of the optical fiber assembly.

11 Claims, 5 Drawing Sheets

(56) References Cited

U.S. PATENT DOCUMENTS

| | | | |
|---|---|---|---|
| 5,848,212 A | 12/1998 | Wagman | |
| 5,857,051 A | 1/1999 | Travieso et al. | |
| 6,049,648 A | 4/2000 | Stokes et al. | |
| 6,317,543 B1 | 11/2001 | Sheu | |
| 7,366,383 B2 | 4/2008 | Shimoda et al. | |
| 8,218,926 B2 | 7/2012 | Griffioen | |
| 9,939,599 B2 | 4/2018 | Blazer et al. | |
| 10,782,496 B1 | 9/2020 | Risch et al. | |
| 11,520,114 B2 | 12/2022 | Boxer et al. | |
| 12,204,156 B2 | 1/2025 | Lee et al. | |
| 2011/0110635 A1 | 5/2011 | Toge et al. | |
| 2014/0233899 A1 | 8/2014 | Miyamoto et al. | |
| 2016/0161692 A1 | 6/2016 | Namazue et al. | |
| 2016/0377824 A1 | 12/2016 | Gimblet et al. | |
| 2017/0153404 A1 | 6/2017 | Takeda et al. | |
| 2019/0369350 A1 | 12/2019 | Bullock et al. | |
| 2024/0241336 A1* | 7/2024 | Sato | G02B 6/4404 |
| 2025/0067947 A1* | 2/2025 | Sato | G02B 6/4403 |
| 2025/0067948 A1* | 2/2025 | Sato | G02B 6/44 |

FOREIGN PATENT DOCUMENTS

| | | |
|---|---|---|
| CN | 111837063 A | 10/2020 |
| JP | H02-157806 A | 6/1990 |
| JP | H07-234349 A | 9/1995 |
| JP | H08-160265 A | 6/1996 |
| JP | 2627976 B2 | 7/1997 |
| JP | H11-84185 A | 3/1999 |
| JP | 2001-133670 A | 5/2001 |
| JP | 2002-072032 A | 3/2002 |
| JP | 2002303769 A | 10/2002 |
| JP | 2004-021214 A | 1/2004 |
| JP | 2005091431 A | 4/2005 |
| JP | 2007-233252 A | 9/2007 |
| JP | 2010-008923 A | 1/2010 |
| JP | 2011-081089 A | 4/2011 |
| JP | 2014-16530 A | 1/2014 |
| JP | 2014-106380 A | 6/2014 |
| JP | 2014-211526 A | 11/2014 |
| JP | 2014-228687 A | 12/2014 |
| JP | 2015-225168 A | 12/2015 |
| JP | 2016-148709 A | 8/2016 |
| JP | 5960400 B2 | 8/2016 |
| JP | 2017-021153 A | 1/2017 |
| JP | 2017-058593 A | 3/2017 |
| JP | 2017-126022 A | 7/2017 |
| JP | 6163227 B1 | 7/2017 |
| JP | 2017-142285 A | 8/2017 |
| JP | 2018-017774 A | 2/2018 |
| JP | 2018-112604 A | 7/2018 |
| JP | 6413593 B2 | 10/2018 |
| JP | 2018-180329 A | 11/2018 |
| JP | 6462472 B2 | 1/2019 |
| JP | 2019-056837 A | 4/2019 |
| JP | 2019-105833 A | 6/2019 |
| JP | 2019-159078 A | 9/2019 |
| JP | 6618744 B2 | 12/2019 |
| JP | 6641428 B2 | 2/2020 |
| JP | 2020-042175 A | 3/2020 |
| JP | 2020-106734 A | 7/2020 |
| JP | 6719175 B2 | 7/2020 |
| JP | 2021-135329 A | 9/2021 |
| JP | 2021-157154 A | 10/2021 |
| TW | 455723 B | 9/2001 |
| TW | 201100890 A | 1/2011 |
| TW | 201142400 A | 12/2011 |
| TW | 1663440 B | 6/2019 |
| WO | 2015/108529 A1 | 7/2015 |
| WO | 2018039178 A1 | 3/2018 |
| WO | 2019/054516 A1 | 3/2019 |
| WO | 2021/106538 A1 | 6/2021 |
| WO | 2021/157334 A1 | 8/2021 |
| WO | 2021/157394 A1 | 8/2021 |
| WO | 2022/004362 A1 | 1/2022 |

OTHER PUBLICATIONS

International Search Report issued in related International Application No. PCT/JP2022/046227 mailed Feb. 21, 2023 (3 pages).
International Search Report issued in related International Application No. PCT/JP2022/044809 mailed Feb. 21, 2023 (2 pages).
International Search Report issued in related International Application No. PCT/JP2022/044822 mailed Feb. 21, 2023 (2 pages).
International Search Report issued in related International Application No. PCT/JP2022/044824 mailed Feb. 21, 2023 (3 pages).
International Search Report issued in related International Application No. PCT/JP2022/044827 mailed Feb. 21, 2023 (2 pages).
Office Action issued in the related Taiwanese Patent Application No. 111146703, mailed Oct. 4, 2023 (4 pages).

* cited by examiner

| UNIT NUMBER | RIBBON NUMBER | | | | | | AVERAGE sin α | LOSS-INCREASING AMOUNT (dB/km) |
|---|---|---|---|---|---|---|---|---|
| | 1 | 2 | 3 | 4 | 5 | 6 | | |
| 1 | 0.80 | 1.00 | 1.00 | 0.99 | 0.99 | 0.97 | 0.96 | 0.020 |
| 2 | 0.87 | 0.81 | 0.61 | 0.47 | 0.01 | 0.10 | 0.48 | 0.035 |
| 3 | 0.35 | 0.52 | 0.49 | 0.73 | 0.57 | 0.68 | 0.56 | 0.041 |
| 4 | 0.66 | 0.58 | 0.52 | 0.48 | 0.40 | 0.36 | 0.50 | 0.123 |
| 5 | 1.00 | 0.98 | 0.87 | 0.81 | 0.81 | 0.79 | 0.88 | 0.023 |
| 6 | 0.96 | 0.94 | 0.93 | 0.91 | 0.88 | 0.87 | 0.92 | 0.030 |
| 7 | 0.99 | 0.98 | 0.95 | 0.91 | 0.81 | 0.85 | 0.91 | 0.020 |
| 8 | 1.00 | 0.96 | 0.97 | 0.99 | 1.00 | 1.00 | 0.99 | 0.020 |
| 9 | 1.00 | 1.00 | 1.00 | 1.00 | 1.00 | 1.00 | 1.00 | 0.010 |
| 10 | 0.45 | 0.37 | 0.30 | 0.22 | 0.15 | 0.08 | 0.26 | 0.182 |
| 11 | 0.81 | 0.77 | 0.70 | 0.75 | 0.70 | 0.64 | 0.73 | 0.041 |
| 12 | 0.99 | 1.00 | 0.99 | 0.98 | 0.95 | 0.90 | 0.97 | 0.021 |

OPTICAL FIBER ASSEMBLY AND OPTICAL CABLE

TECHNICAL FIELD

The present invention relates to an optical fiber assembly and an optical cable.

This is a national stage of International Patent Application No. PCT/JP2022/046215, filed Dec. 15, 2022, which claims priority from Japanese Patent Application No. 2021-212141, filed Dec. 27, 2021. The content of these documents are incorporated herein by reference in their entirety.

BACKGROUND

Patent Document 1 discloses an optical fiber cable (optical cable) having a cable core (optical fiber assembly) in which a plurality of optical fiber units (ribbon core wire unit) are aggregated, and the optical fiber unit is formed by stacking and bundling a plurality of optical fiber ribbons.

Patent Document 1

Japanese Unexamined Patent Application, First Publication No. 2007-233252.

In a case where the optical cable having the above-described optical fiber assembly is manufactured without a measure, when bending occurs in the optical cable or shrinkage occurs in the outer sheath of the optical cable in a low-temperature environment, stress (mainly, bending stress) is likely to be concentrated on the optical fiber of a specific optical fiber unit. When stress is concentrated on the specific optical fiber, transmission loss of the optical fiber increases.

SUMMARY

One or more embodiments of the present invention provide an optical fiber assembly capable of reducing an increase in transmission loss of an optical fiber, and an optical cable including the optical fiber assembly.

An optical fiber assembly according to one or more embodiments of the present invention is an optical fiber assembly configured by bundling a plurality of optical fiber units each of which is formed by stacking a plurality of optical fiber ribbons, in which a stacked state of the plurality of optical fiber ribbons in the optical fiber unit is collapsed such that a ribbon surface of at least one of the optical fiber ribbons configuring the optical fiber unit is bent, in a cross section of the optical fiber assembly orthogonal to a longitudinal direction of the optical fiber assembly at least at a certain position in the longitudinal direction, the plurality of optical fiber units include a plurality of inner layer fiber units located on an inner side in a radial direction of the optical fiber assembly, and a plurality of outer layer fiber units located on an outer side in the radial direction of the optical fiber assembly relative to the inner layer fiber units, in the cross section of the optical fiber assembly orthogonal to the longitudinal direction, regarding a sine value sinα of an angle α formed by a radial direction straight line connecting a center of the optical fiber assembly and a center of gravity of the optical fiber ribbon and a ribbon width direction straight line connecting both ends of the optical fiber ribbon, an average value of the sine values sinα of the plurality of optical fiber ribbons in the same optical fiber unit is defined as an average sine value $\sin\alpha_{ave}$, and the average sine value $\sin\alpha_{ave}$ of the outer layer fiber unit is 0.366 or more, in a cross section of the optical fiber assembly orthogonal to the longitudinal direction at least at the certain position in the longitudinal direction of the optical fiber assembly.

An optical cable according to one or more embodiments of the present invention includes the optical fiber assembly according to the above-described embodiments, and an outer sheath that houses the optical fiber assembly therein.

According to one or more embodiments of the present invention, an increase in transmission loss of the optical fiber can be reduced.

DETAILED DESCRIPTION

Hereinafter, embodiments of the present invention will be described with reference to FIGS. 1 to 9.

Figure 1:
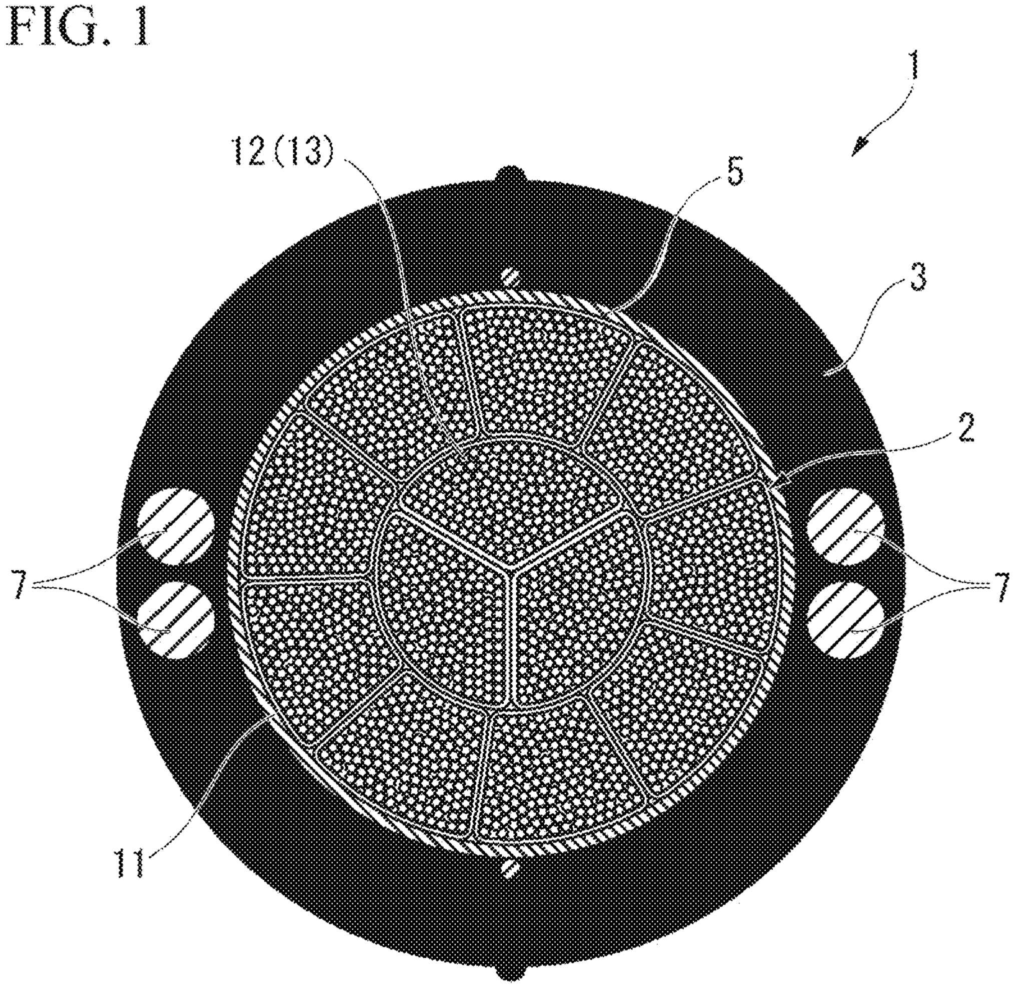
FIG. 1 is a schematic cross-sectional view of an optical cable including an optical fiber assembly according to one or more embodiments.

As shown in FIG. 1, an optical fiber assembly 2 according to one or more embodiments configures a part of the optical cable 1. The optical cable 1 according to one or more embodiments is a so-called slotless type optical cable that does not have a slot rod in which a groove (slot) for housing an optical fiber is formed. The optical cable 1 includes an optical fiber assembly 2 and an outer sheath 3.

The optical fiber assembly 2 is formed by bundling a plurality of optical fiber units 11. The optical fiber unit 11 is a structural body in which a plurality of optical fibers 13 are bundled. A specific structure of the optical fiber unit 11 will be described below. The optical fiber assembly 2 according to one or more embodiments configures a core of the optical cable 1.

The core of the optical cable 1 according to one or more embodiments further includes a wrapping tube 5 that covers the plurality of optical fiber units 11. The wrapping tube 5 may be formed of, for example, a water absorbing tape. In one or more embodiments, the wrapping tube 5 configures an internal space of the optical fiber assembly 2 in which a plurality of optical fiber units 11 are disposed.

The above-described wrapping tube 5 may be omitted, for example. In this case, an inner surface of the outer sheath 3, which will be described later, forms the internal space of the optical fiber assembly 2.

The outer sheath 3 is formed in a tubular shape. The optical fiber assembly 2 is housed inside the outer sheath 3. The plurality of optical fiber units 11 may be housed in the inside of the outer sheath 3 in a twisted state in one direction or in an SZ manner, for example. In addition to the plurality of optical fiber units 11, a filling (not shown) may be housed inside the outer sheath 3. The filling may be, for example, a water absorbing material. The filling may be disposed on the inner side, the outer side, or both of the wrapping tube 5.

The above-described filling may be absent, for example.

An outer shape of the optical fiber assembly 2 in a cross section orthogonal to a longitudinal direction of the optical cable 1 (a direction orthogonal to any of the up-down direction and the left-right direction in FIG. 1, or a direction in which the optical cable 1 extends) may be any shape, but has a substantially circular shape in one or more embodiments. In the present specification, the substantially circular shape includes not only a perfect circular shape but also an elliptical shape, an oblong shape, and the like. The outer shape of the optical fiber assembly 2 in the cross section may be, for example, a rectangular shape.

The outer sheath 3 is a member that covers the optical fiber assembly 2. The inner surface of the outer sheath 3 forms a space for housing the optical fiber assembly 2. In one or more embodiments, the inner surface of the outer sheath 3 has a substantially circular shape corresponding to the optical fiber assembly 2 in a cross section orthogonal to the longitudinal direction of the optical cable 1. The cross-sectional shape of the inner surface of the outer sheath 3 may be, for example, a rectangular shape. In one or more embodiments, the wrapping tube 5 that wraps the plurality of optical fiber units 11 is housed inside the outer sheath 3.

The tension member 7 is disposed in the outer sheath 3. All of the tension members 7 may be disposed in the outer sheath 3, or a part of the tension members 7 may be disposed in the outer sheath 3 and the other part of the tension members 7 may be exposed from the outer sheath 3. Another member, such as a rip cord, may be disposed in the outer sheath 3.

The tension member 7 is disposed in a plurality of pieces so as to sandwich the optical fiber assembly 2 in a cross section orthogonal to the longitudinal direction of the optical cable 1. In the cross section, the plurality of tension members 7 are disposed to face each other with the optical fiber assembly 2 interposed therebetween in a first direction orthogonal to the longitudinal direction. In one or more embodiments, in the cross section, the other tension members that are disposed to face each other with the optical fiber assembly 2 interposed therebetween are not disposed in the second direction orthogonal to both the longitudinal direction and the first direction, but the present invention is not limited to this, and the other tension members that are disposed to face each other with the optical fiber assembly 2 interposed therebetween may be disposed in the second direction. Each tension member 7 extends in the longitudinal direction of the optical cable 1. Each tension member 7 may be disposed to be parallel to the longitudinal direction of the optical fiber assembly 2, or may be disposed in a helical shape around the optical fiber assembly 2. Further, each tension member 7 may be included in the optical fiber assembly 2.

In FIG. 1, two tension members 7 are used as one set, and a pair of sets are disposed on both sides of the optical fiber assembly 2, but the present invention is not limited to this. For example, three or more tension members 7 may be used as one set, and a pair of sets may be disposed on both sides of the optical fiber assembly 2, or one tension member 7 may be disposed on each of both side of the optical fiber assembly 2. Further, in FIG. 1, the plurality of tension members 7 forming a set are spaced apart from each other, but may be in contact with each other, for example. Further, the plurality of tension members 7 that form a set may be twisted.

Figure 2:
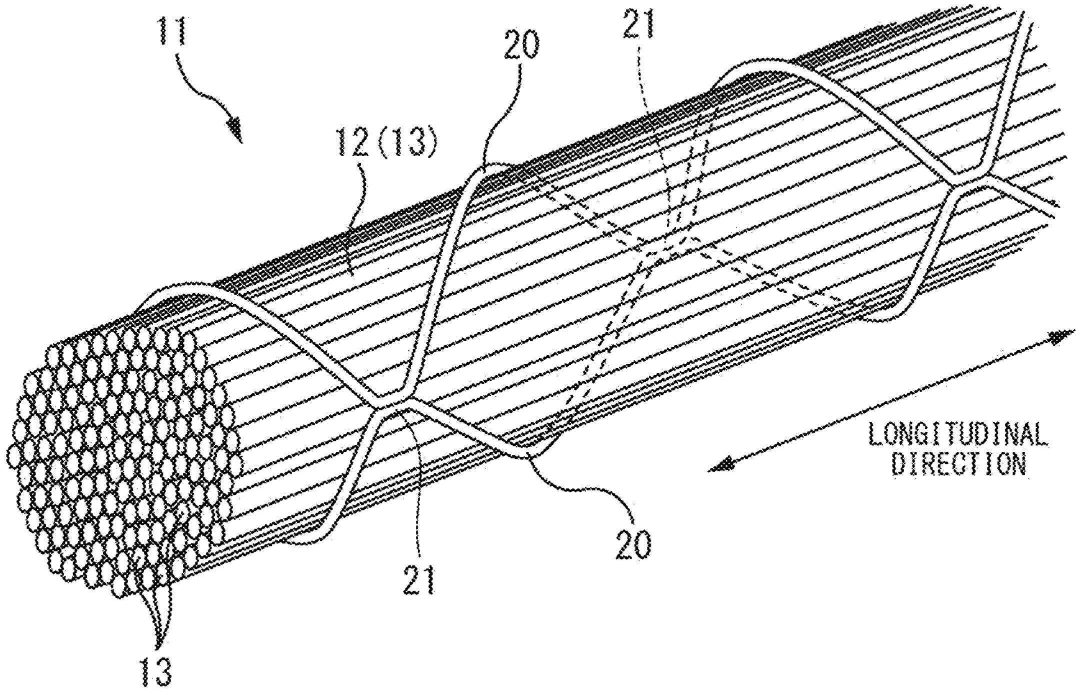
FIG. 2 is a perspective view schematically showing an optical fiber unit provided in the optical fiber assembly of FIG. 1.

As shown in FIG. 2, the optical fiber unit 11 according to one or more embodiments has a structure in which a plurality of optical fibers 13 are bundled by a line body 20 (bundle material). The line body 20 is wound around the outer peripheries of the plurality of optical fibers 13 such that the plurality of optical fibers 13 are not separated from each other. The optical fiber unit 11 may have a structure in which the plurality of optical fibers 13 are twisted together to be bundled without using the line body 20, for example.

The optical fiber unit 11 according to one or more embodiments is configured by bundling a plurality of optical fibers 13 to form an optical fiber ribbon 12 having a plurality of optical fibers. It should be noted that the optical fiber ribbon 12 and the non-ribbon optical fiber 13 may be mixed in the optical fiber unit 11.

The optical fiber 13 includes a glass body including a core and a cladding, and a coating layer that covers the glass body. The coating layer may include a coloring layer for identifying the optical fiber 13. A diameter of the glass body is, for example, 125 μm, and a diameter of the coating layer (that is, a diameter of the optical fiber 13) is, for example, 200 to 250 μm. Note that the diameter of the glass body is changeable, and may be, for example, 60 μm, 80 μm, 100 μm, or the like, as long as it is less than 125 μm. The diameter of the coating layer can also be changed, and may be, for example, 200 μm or less such as 160 μm, 180 μm, or 200 μm.

Figure 3:
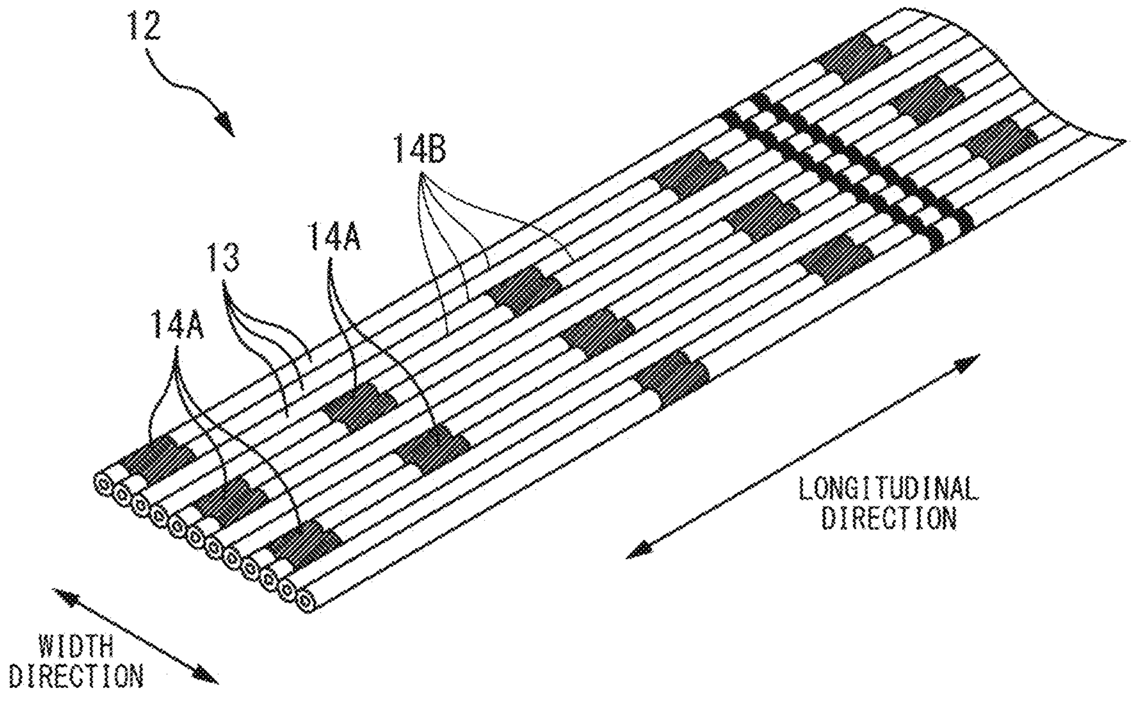
FIG. 3 is a perspective view schematically showing optical fiber ribbons included in the optical fiber unit of FIG. 2.

As shown in FIG. 3, the optical fiber ribbon 12 is configured by arranging the plurality of optical fibers 13 in parallel and connecting the adjacent optical fibers 13 to each other. In the following description, in the optical fiber ribbon 12, a direction in which the optical fiber 13 extends may be referred to as a longitudinal direction of the optical fiber ribbon 12, and an arrangement direction of the plurality of optical fibers 13 may be referred to as a width direction of the optical fiber ribbon 12. Further, a direction orthogonal to a longitudinal direction and a width direction of the optical fiber ribbon 12 is defined as a thickness direction of the optical fiber ribbon 12, and a surface facing the thickness direction is sometimes referred to as a ribbon surface.

The optical fiber ribbon 12 according to one or more embodiments is an intermittent connection type optical fiber ribbon in which a plurality of (12 in FIG. 3) optical fibers 13 are arranged in parallel and connected to each other in an intermittent manner (partially). Two adjacent optical fibers 13 are connected to each other by a connecting portion 14A. A plurality of the connecting portions 14A are disposed between the two adjacent optical fibers 13 at intervals in the longitudinal direction of the optical fiber ribbon 12. Further, the connecting portion 14A that connects the predetermined optical fiber 13 and the optical fiber 13 adjacent to one side of the optical fiber 13 is displaced from the connecting portion 14A that connects the predetermined optical fiber 13 and the optical fiber 13 adjacent to the other side of the optical fiber 13 in the longitudinal direction. That is, the plurality of connecting portions 14A are two-dimensionally and intermittently disposed in the longitudinal direction and the width direction of the optical fiber ribbon 12. A region of the two adjacent optical fibers 13 that is not connected by the connecting portion 14A is a non-connecting portion 14B. In the non-connecting portion 14B, the two adjacent optical fibers 13 are not constrained.

The intermittent connection type optical fiber ribbon 12 is not limited to the one shown in FIG. 3. For example, the disposition pattern of the connecting portions 14A that are intermittently disposed may not be a certain pattern. Further, in the intermittent connection type optical fiber ribbon 12, for example, with a plurality (for example, two) of optical fibers 13 as a set, a plurality of sets may be arranged in parallel, and adjacent sets of optical fibers 13 may be connected intermittently by the connecting portions 14A. Further, the optical fibers 13 adjacent to each other in the optical fiber ribbon 12 may be spaced from each other or may be in contact with each other. Further, the number of the optical fibers 13 in the optical fiber ribbon 12 is generally a multiple of 4 (4-core, 8-core, 12-core, or 16-core), but the present invention is not limited thereto. The number of optical fibers 13 in the optical fiber ribbon 12 may be, for example, an odd number.

The optical fiber ribbon 12 can be flexibly deformed in the width direction thereof. For example, the optical fiber ribbon 12 can be deformed such that one ribbon surface thereof is bent in a convex manner. Further, for example, the optical fiber ribbon 12 can be deformed such that the ribbon surface thereof is uneven in the width direction (meandering in the width direction). In particular, since the intermittent connection type optical fiber ribbon 12 has remarkable flexibility in the width direction, the characteristics of the optical fiber 13 are less likely to deteriorate even in a case where the optical fiber ribbons 12 are mounted at a high density.

As shown in FIG. 2, the line body 20 that bundles the plurality of optical fiber ribbons 12 (optical fibers 13) is a thread-like, string-like, or tape-like member having flexibility. The line body 20 is wound around an outer periphery of a bundle of the plurality of the optical fiber ribbons 12. The plurality of optical fiber ribbons 12 may be bundled by, for example, one or three or more line bodies 20. In the optical fiber unit 11 shown in FIG. 2, the plurality of optical fiber ribbons 12 are bundled by two line bodies 20. The plurality of optical fiber ribbons 12 are not limited to being bundled by winding around the line body 20, and may be bundled, for example, by being inserted into a flexible tube or by being wound around a flexible film.

The two line bodies 20 may be wound around the bundle of the optical fiber ribbons 12 in a helical shape, for example. In one or more embodiments, the two line bodies 20 are wound around the bundle of the optical fiber ribbons 12 in an SZ manner, respectively. That is, the winding direction of each line body 20 is reversed such that each line body 20 is wound half the outer periphery of the bundle of the optical fiber ribbons 12. The two line bodies 20 are joined to each other at positions where the winding directions thereof are reversed. Reference numeral 21 in FIG. 2 indicates a joint portion of the two line bodies 20. The two line bodies 20 may be joined to each other by, for example, thermal welding or adhesion.

The line body 20 is attached to follow an outer shape of the bundle of the optical fiber ribbons 12. Therefore, the outer shape of the bundle of the optical fiber ribbons 12 can be maintained. As a result, a plurality of optical fiber ribbons 12 can be held even in a state in which the stacked state is collapsed (described later).

Figure 4:
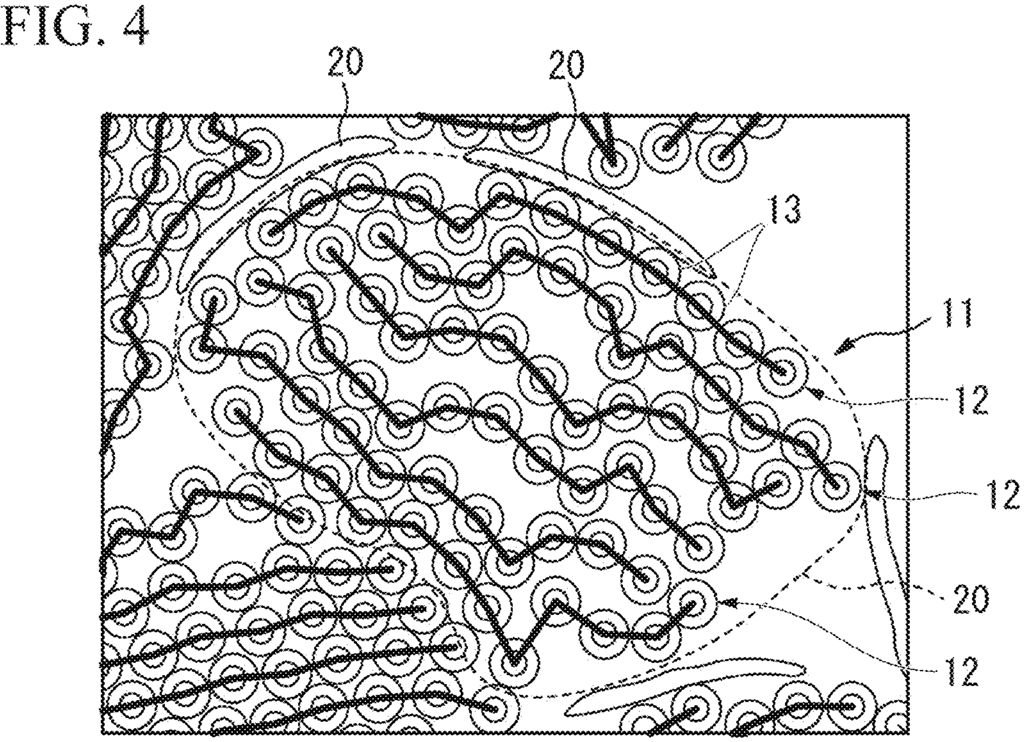
FIG. 4 is a diagram showing an example of a cross-sectional shape of the optical fiber unit of FIG. 2.

As shown in FIG. 4, the optical fiber unit 11 is configured by bundling a plurality of optical fiber ribbons 12 with a line body 20 in a state where the plurality of optical fiber ribbons 12 are stacked. In the optical fiber unit 11 according to one or more embodiments, the stacked state of the plurality of bundled optical fiber ribbons 12 is collapsed in a cross section orthogonal to the longitudinal direction of the optical fiber assembly 2. The "stacked state of the plurality of optical fiber ribbons 12 is collapsed" means a state different from a state in which the plurality of optical fiber ribbons 12 are stacked in a state where the ribbon surface is flat without the plurality of optical fiber ribbons 12 being bent in the width direction, and also means a state in which the ribbon surface of at least one optical fiber ribbon 12 configuring the optical fiber unit 11 is bent in the width direction. Further, the state in which the ribbon surface of the optical fiber ribbon 12 is bent means that, in a cross section of the optical fiber ribbon 12 orthogonal to the longitudinal direction of the optical fiber ribbon 12, the midpoint between the optical fibers 13 at both ends of the optical fiber ribbon 12 in the width direction and the center of gravity (that is, the geometric center) of the optical fiber ribbon 12 are displaced from each other.

In the optical fiber unit 11 shown in FIG. 4, the plurality of optical fiber ribbons 12 in which the stacked state is collapsed are all bent or meandered in the width direction.

In one or more embodiments, the plurality of optical fiber ribbons 12 configuring the same optical fiber unit 11 are bundled by the line body 20, so that the stacked state of the plurality of optical fiber ribbons 12 is collapsed. The outer shape of the optical fiber unit 11 shown in FIG. 4 is different from the outer shape of the optical fiber unit 11 shown in FIG. 1, and is not arranged in accordance with the collapse of the stacked state of the plurality of optical fiber ribbons 12.

The state in which the stacked state of the plurality of optical fiber ribbons 12 is collapsed may be established at any position (or all positions) in the longitudinal direction of the optical fiber unit 11 (the optical fiber assembly 2), but may be established at least at a certain position in the longitudinal direction of the optical fiber unit 11 (the optical fiber assembly 2).

Figure 5:
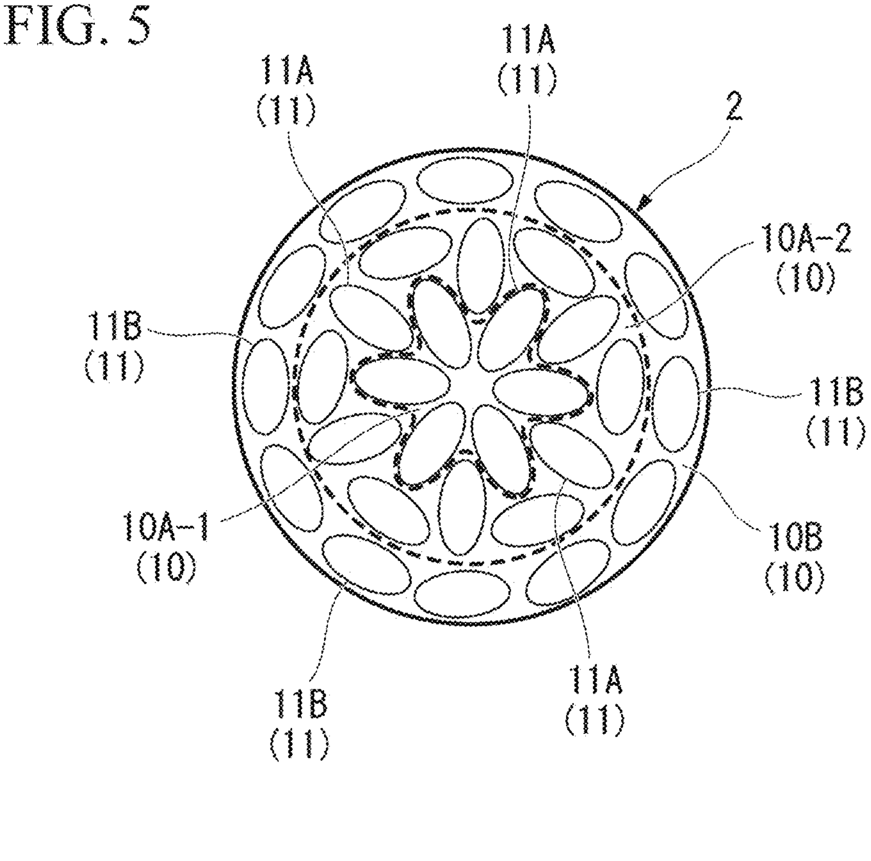
FIG. 5 is a cross-sectional view schematically showing a first disposition example of a plurality of optical fiber units in the optical fiber assembly according to one or more embodiments.
Figure 6:
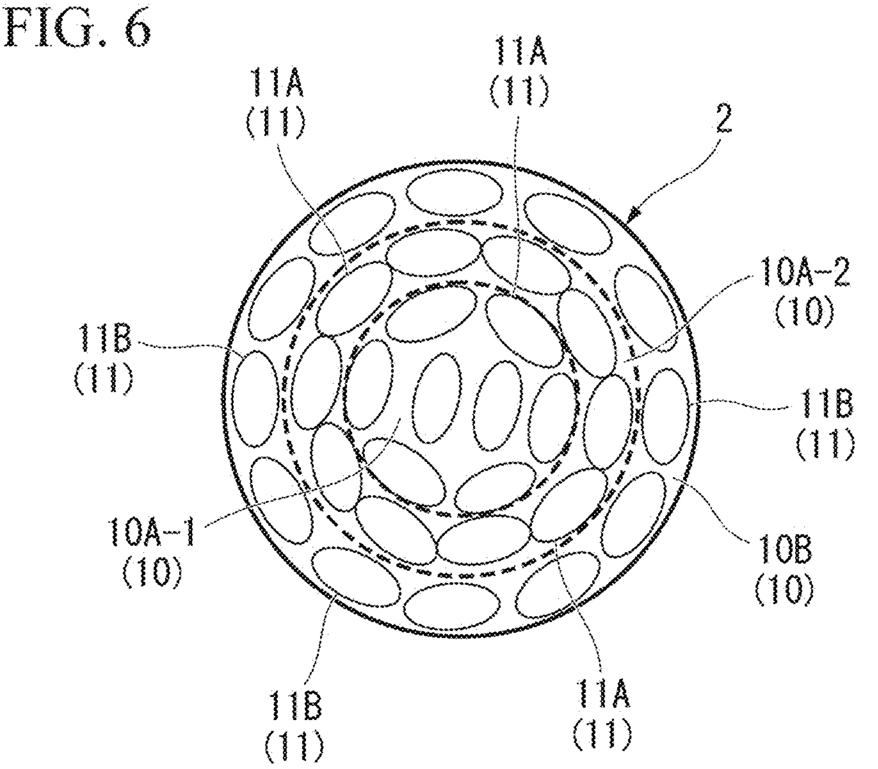
FIG. 6 is a cross-sectional view schematically showing a second disposition example of the plurality of optical fiber units in the optical fiber assembly.

In FIGS. 5 and 6, a region having the optical fiber unit 11 in which the stacked state is collapsed is schematically shown in an elliptical shape. A direction of the major axis of each elliptical shape substantially corresponds to the width direction of the optical fiber ribbon 12. A direction of the minor axis of each elliptical shape substantially corresponds to the stacked direction of the plurality of optical fiber ribbon 12.

As shown in FIGS. 5 and 6, in the optical fiber assembly 2, the plurality of optical fiber units 11 are stacked in a radial direction of the optical fiber assembly 2 (a direction orthogonal to a center line passing through a center (geometric center) of the optical fiber assembly 2 in FIGS. 5 and 6) to form a plurality of fiber unit layers 10 arranged in the radial direction of the optical fiber assembly 2. The number of fiber unit layers 10 in FIGS. 5 and 6 is, for example, three. Among the three fiber unit layers 10, two fiber unit layers 10 located on the inner side in the radial direction of the optical fiber assembly 2 are inner layers 10A (10A-1 and 10A-2), and one fiber unit layer 10 located on the outer side in the radial direction is an outer layer 10B (or an outermost peripheral layer 10B). The two inner layers 10A include a first inner layer 10A-1, and a second inner layer 10A-2 which is located on the outer side in the radial direction with respect to the first inner layer 10A-1.

The plurality of optical fiber units 11 included in the inner layer 10A are a plurality of inner layer fiber units 11A located on the inner side in the radial direction of the optical fiber assembly 2. The plurality of inner layer fiber units 11A are located, for example, at a center of the optical fiber assembly 2 or near the center. Further, the plurality of optical fiber units 11 included in the outer layer 10B are the outer layer fiber units 11B that are located on the outer side in the radial direction of the optical fiber assembly 2 with respect to the inner layer fiber unit 11A. In one or more embodiments, the outer layer fiber unit 11B is included in the fiber unit layer 10 (outer layer 10B) located at the outermost periphery.

Next, the dispositions (directions) of the inner layer fiber unit 11A and the outer layer fiber unit 11B in a cross section of the optical fiber assembly 2 orthogonal to the longitudinal direction will be described.

Figure 7:
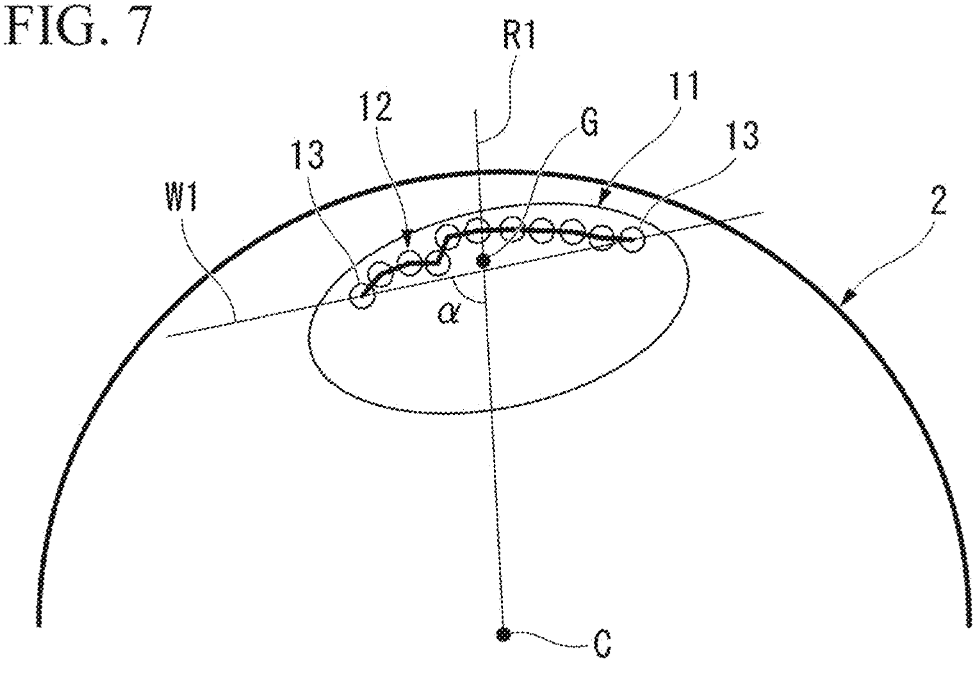
FIG. 7 is a diagram showing an angle α formed by a radial direction straight line R1 connecting a center C of the optical fiber assembly and a center of gravity G of the optical fiber ribbon and a ribbon width direction straight line W1 connecting both ends of the optical fiber ribbon.

First, with reference to FIG. 7, an index indicating the direction of each optical fiber unit 11 in a cross section of the optical fiber assembly 2 will be described. As shown in FIG. 7, in a cross section of the optical fiber assembly 2 orthogonal to the longitudinal direction, a straight line connecting the center C of the optical fiber assembly 2 and the center of gravity G of the predetermined optical fiber ribbon 12 of the predetermined optical fiber unit 11 is defined as a radial direction straight line R1. Further, a straight line connecting both ends of the predetermined optical fiber ribbon 12 of the predetermined optical fiber unit 11 (the optical fiber 13 located at both ends of the optical fiber ribbon 12 in the width direction) is defined as a ribbon width direction straight line W1.

In a cross section orthogonal to the longitudinal direction, the direction of the predetermined optical fiber ribbon 12 included in the predetermined optical fiber unit 11 is indicated by the sine value $\sin\alpha$ of the angle $\alpha(0° \le \alpha \le 180°)$ formed by the radial direction straight line R1 and the ribbon width direction straight line W1. In a case in which the sine value $\sin\alpha$ indicating the direction of the optical fiber ribbons 12 is large (close to 1), the optical fiber ribbons 12 are disposed such that the width direction (or the ribbon surface) thereof is along the circumferential direction of the optical fiber assembly 2 (the outer sheath 3) (the direction around the center of the optical fiber assembly 2 in FIG. 5 and FIG. 6). On the other hand, in a case in which the sine value $\sin\alpha$ indicating the direction of the optical fiber ribbon 12 is small (close to 0), the optical fiber ribbons 12 are disposed such that the width direction (or the ribbon surface) thereof is along the radial direction of the optical fiber assembly 2.

In a cross section orthogonal to the longitudinal direction, the direction of the optical fiber unit 11 is represented by an average value of the sine values $\sin\alpha$ (average sine value $\sin\alpha_{ave}$) of the plurality of optical fiber ribbons 12 in the same optical fiber unit 11. That is, the average sine value $\sin\alpha_{ave}$ represents an average of sine values in the direction in which the plurality of optical fiber ribbons 12 configuring the same optical fiber unit 11 are facing. The fact that the average sine value $\sin\alpha_{ave}$ indicating the direction of the optical fiber unit 11 is large (close to 1) means that the stack direction of the plurality of optical fiber ribbons 12 in the optical fiber unit 11 faces the radial direction of the optical fiber assembly 2 (or close to the radial direction). On the other hand, the fact that the average sine value $\sin\alpha_{ave}$ indicating the direction of the optical fiber unit 11 is small (close to 0) means that the stack direction of the plurality of optical fiber ribbons 12 in the optical fiber unit 11 faces the circumferential direction of the optical fiber assembly 2 (or close to the circumferential direction).

In the optical fiber assembly 2 according to one or more embodiments, in a cross section orthogonal to the longitudinal direction thereof, the average sine value $\sin\alpha_{ave}$ of the outer layer fiber unit 11B shown in FIGS. 5 and 6 is 0.366 or more. The reason for this will be described below.

Further, in the present specification, the average of the average sine value $\sin\alpha_{ave}$ of all the inner layer fiber units 11A is referred to as an “inner index”, and the average of the average sine value $\sin\alpha_{ave}$ of all the outer layer fiber units 11B is referred to as an “outer index”. In one or more embodiments, the inner index is smaller than the outer index.

The fact that the inner index is smaller than the outer index means that, as in the first disposition example shown in FIG. 5, there is a strong tendency in which with respect to the circumferential direction of the optical fiber assembly 2, the angle of the width direction of the optical fiber ribbons 12 of the inner layer fiber unit 11A is highly likely to be larger than the angle of the width direction of the optical fiber ribbons 12 of the outer layer fiber unit 11B. In other words, at least some of the plurality of inner layer fiber units 11A are disposed such that the width direction of the optical fiber ribbon 12 faces the radial direction of the optical fiber assembly 2 as compared with the outer layer fiber unit 11B. Further, it can also be said that the plurality of inner layer fiber units 11A are disposed such that the width direction of the optical fiber ribbon 12 faces various directions as viewed from the center of the optical fiber assembly 2 as compared with the outer layer fiber unit 11B.

Further, in the first disposition example shown in FIG. 5, with respect to the thickness of the optical fiber unit 11 in the radial direction of the optical fiber assembly 2, the thickness of the outer layer fiber unit 11B located at the outermost periphery is the thinnest among all the optical fiber units 11 configuring the optical fiber assembly 2.

In the second disposition example shown in FIG. 6, with respect to the circumferential direction of the optical fiber assembly 2, the angle of the optical fiber ribbon 12 in the width direction of the inner layer fiber unit 11A is the same as the angle of the optical fiber ribbon 12 in the width direction of the outer layer fiber unit 11B. That is, in the second disposition example shown in FIG. 6, the average sine value $\sin\alpha_{ave}$ of the inner layer fiber unit 11A is the same as the average sine value $\sin\alpha_{ave}$ of the outer layer fiber unit 11B. In other words, there is no difference between the inner index and the outer index.

In addition, the two contents described above (the average sine value $\sin\alpha_{ave}$ of the outer layer fiber unit 11B is 0.366 or more, and the inner index is smaller than the outer index) may not be established at all positions in the longitudinal direction of the optical fiber assembly 2, and may be established at least at a certain position in the longitudinal direction. The two contents described above may be established, for example, in a cross section (certain cross section) of the optical fiber assembly 2 orthogonal to the longitudinal direction at a certain position within the range of each twist pitch (one pitch) in the longitudinal direction. That is, in a cross section different from the certain cross section described above within the range of the twist pitch, the two contents described above may not be established. In addition, the two contents described above may be established, for example, over the entire optical fiber assembly 2 in the longitudinal direction.

The above-described twist pitch (one pitch) is a length in the longitudinal direction for the optical fiber units 11 disposed in a helical shape to make one turn in the circumferential direction, in a case where the plurality of optical fiber units 11 are twisted in one direction. Further, in a case where the plurality of optical fiber units 11 are twisted in an SZ manner, the twist pitch (one pitch) is a length (interval) in the longitudinal direction from a position where the twist direction is reversed to a position where the twist direction is reversed next in the same direction. That is, the twist pitch (one pitch) is a length obtained by adding one section in the S direction and one section in the Z direction.

Next, an example of a manufacturing method of the optical cable 1 according to one or more embodiments will be described.

In a case of manufacturing the optical cable 1 according to one or more embodiments, first, as shown in FIG. 4, a plurality of optical fiber units 11 in which a plurality of optical fiber ribbons 12 are bundled such that the stacked state of the plurality of optical fiber ribbons 12 is collapsed are prepared. In order to collapse the stacked state of the plurality of optical fiber ribbons 12 when preparing the optical fiber unit 11, for example, the optical fiber ribbons 12 may be deformed in the width direction thereof by squeezing the plurality of stacked optical fiber ribbons 12 thinly in the width direction thereof. Next, an assembly configuring step of bundling the plurality of optical fiber units 11 to form an optical fiber assembly 2 is executed.

In the assembly configuring step, the outer layer fiber unit 11B may be disposed such that the average sine value $\sin\alpha_{ave}$ of the outer layer fiber unit 11B is 0.366 or more, in a cross section (certain cross section) orthogonal to the longitudinal direction at a certain position in the longitudinal direction of at least the optical fiber assembly 2. In order to dispose the outer layer fiber unit 11B in this way, for example, the direction of the outer layer fiber unit 11B is adjusted until a plurality of the optical fiber units 11 reach an assembly point (a position of the optical fiber unit 11 when the configuration of the optical fiber assembly 2 is completed). Further, in the assembly configuring step, the inner layer fiber unit 11A and the outer layer fiber unit 11B may be disposed such that, in a certain cross section of at least the optical fiber assembly 2, for example, the inner index is smaller than the outer index.

Further, in a case where the plurality of optical fiber units 11 are twisted in one direction or in an SZ manner in the assembly configuring step, in the step, the inner layer fiber unit 11A and the outer layer fiber unit 11B may be disposed such that the average sine value $\sin\alpha_{ave}$ of the outer layer fiber unit 11B is 0.366 or more, and the inner index is smaller than the outer index, in a certain cross section within a range of a twist pitch (one pitch).

The above-described assembly configuring step may be performed, for example, when the plurality of optical fiber units 11 are housed inside the outer sheath 3 (see FIG. 1), or may be performed, for example, before the optical fiber assembly 2 is housed inside the outer sheath 3.

The manufacturing of the optical cable 1 is completed by housing the optical fiber assembly 2 (bundled plurality of optical fiber units 11) inside the outer sheath 3.

As described above, in the optical fiber assembly 2 according to one or more embodiments and the optical cable 1 including the same, the average sine value $\sin\alpha_{ave}$ of the outer layer fiber unit 11B is 0.366 or more. As a result, it is possible to reduce an increase in the transmission loss of the optical fiber 13 in the outer layer fiber unit 11B. Hereinafter, this point will be described with reference to experimental examples shown in FIGS. 8 and 9.

Figures 8, 9:
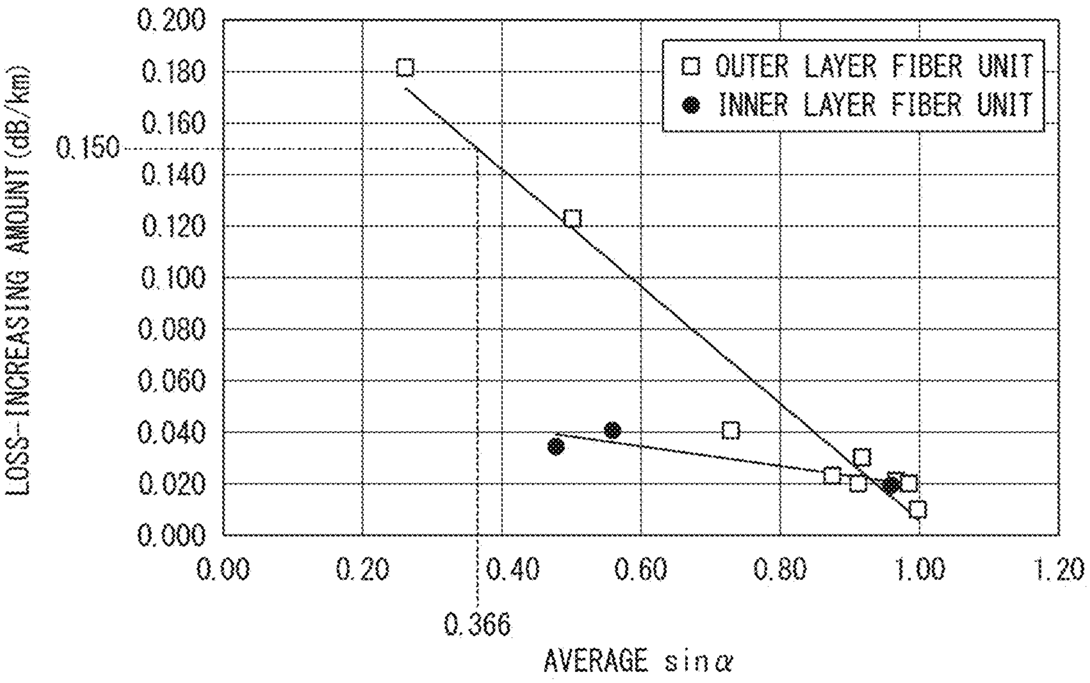
FIG. 8 is a table of an experimental example showing a relationship between an average sine value $\sin\alpha_{ave}$ of a plurality of optical fiber units and an increase amount of a transmission loss of the optical fiber.
FIG. 9 is a graph showing a relationship between an average sine value $\sin\alpha_{ave}$ of a plurality of optical fiber units corresponding to the table of FIG. 8 and the increase amount of the transmission loss of the optical fiber.

The table of the experimental example shown in FIG. 8 shows a relationship between the average sine value $\sin\alpha_{ave}$ of twelve optical fiber units 11 and an increase amount of a transmission loss of the optical fiber 13. The "unit number" in FIG. 8 corresponds to each of the twelve optical fiber units 11. In the experimental example shown in FIG. 8, the first to third optical fiber units 11 are inner layer fiber units 11A, and the fourth to twelfth optical fiber units 11 are outer layer fiber units 11B. Further, the "ribbon number" in FIG. 8 corresponds to each of the six optical fiber ribbons 12 included in each optical fiber unit 11.

Further, in the table shown in FIG. 8, the sine value $\sin\alpha$ of all (72) the optical fiber ribbons 12 configuring the optical fiber assembly 2 is shown in association with the optical fiber unit 11. For example, in the table of FIG. 8, the sine value $\sin\alpha$ of the first optical fiber ribbon 12 in the first optical fiber unit 11 is 0.80. The sine value $\alpha$ of each optical fiber ribbon 12 is based on the angle $\alpha$ (see FIG. 7) of each optical fiber ribbon 12 measured at any five cross sections in the twist pitch of the optical fiber assembly 2 in the longitudinal direction.

The "average $\sin\alpha$" in FIG. 8 is an average value of the sine values $\sin\alpha$ of the six optical fiber ribbons 12 configuring the same optical fiber unit 11 (that is, an average sine value $\sin\alpha_{ave}$).

The "the increase amount of the loss" in FIG. 8 indicates a maximum transmission loss increase amount of the optical fiber 13 measured by the following measurement method (hereinafter, simply referred to as an increase amount of the loss). In the measurement method of measuring the increase amount of the transmission loss of the optical fiber 13, first, a mandrel having a diameter 20 times the diameter of the optical cable 1 is prepared. Next, a bending step is performed in which with the optical cable 1 placed in a straight line as the reference bending angle (0°), the optical cable 1 is pressed against the outer periphery of the mandrel and bent by 90° (+90°), and then the optical cable 1 is pressed against the outer periphery of the mandrel and bent by 90° (−90°) in the direction opposite to the bending direction. The increase amount of the transmission loss of the optical fiber 13 of the optical cable 1 at three bending angles of 0°, +90°, and −90° when the bending step was repeated 25 times was measured with light having a wavelength of 1.55 μm (in accordance with GR-20-CORE Issue4, 6.5.8).

The graph shown in FIG. 9 is a graph showing a relationship between the average sine value $\sin\alpha_{ave}$ of the optical fiber units 11 and an increase amount of a transmission loss of the optical fiber 13 in the experimental example shown in FIG. 8. The graph of FIG. 9 shows three plot points of the inner layer fiber units 11A (the first to third optical fiber units 11 in the table of FIG. 8) and an approximate straight line based on these three plot points. The graph further shows nine plot points of the outer layer fiber units 11B (the fourth to twelfth optical fiber units 11 in the table of FIG. 8) and an approximate straight line based on these nine plot points.

In the graph of FIG. 9, in a case of focusing on the approximate straight lines of the inner layer fiber unit 11A and the outer layer fiber unit 11B, it can be seen that there is a tendency in which in the inner layer fiber unit 11A and the outer layer fiber unit 11B, the increase amount of the transmission loss is likely to increase, as the average sine value $\sin\alpha_{ave}$ decreases (that is, as the angle of the width direction of the optical fiber ribbons 12 with respect to the radial direction of the optical fiber assembly 2 decreases). Hereinafter, this tendency will be described.

For example, a case in which the optical fiber ribbons 12 configuring the optical fiber unit 11 are disposed such that the width direction thereof is along the radial direction of the optical cable 1 (that is, a case in which the average sine value $\sin\alpha_{ave}$ is small) is considered. In such a configuration, for example, when the optical cable 1 (the optical fiber assembly 2) is bent, a larger stress (bending stress) due to large expansion and contraction strain acts on the optical fiber 13 located farthest from the neutral line (the axis line in which the compression or the expansion does not occur when the optical cable 1 is bent) of the bending of the optical cable 1 among the optical fiber ribbons 12 than the other optical fibers 13 of the optical fiber ribbons 12. Therefore, in the optical fiber unit 11 in which the average sine value $\sin\alpha_{ave}$ is small, the increase amount of the transmission loss of the optical fiber 13 increases.

On the other hand, a case in which the optical fiber ribbons 12 configuring the optical fiber unit 11 are disposed such that the width direction thereof is along the circumferential direction of the optical fiber assembly 2 (that is, a case where the average sine value $\sin\alpha_{ave}$ is large) is considered. In such a configuration, in a case where the optical cable 1 is bent, a difference in the expansion and contraction strain generated in the plurality of optical fibers 13 of the same optical fiber ribbon 12 is small. Therefore, the bending stress acting on these optical fibers 13 also decreases. Thus, in the optical fiber unit 11 in which the average sine value $\sin\alpha_{ave}$ is large, the increase amount of the transmission loss of the optical fiber 13 decreases.

Further, in the graph of FIG. 9, when the approximate straight lines of the inner layer fiber unit 11A and the outer layer fiber unit 11B are compared, it can be seen that the outer layer fiber unit 11B is stronger than the inner layer fiber unit 11A in a tendency in which the increase amount of the transmission loss increases as the average sine value $\sin\alpha_{ave}$ decreases. This means that the bending stress acting on the optical fiber 13 in a case where the optical cable 1 is bent increases as the optical fiber unit 11 is located away from the neutral line of bending of the optical cable 1.

From the graph of FIG. 9, it can be seen that, in the outer layer fiber unit 11B, the increase in the transmission loss of the optical fiber 13 in the outer layer fiber unit 11B can be reduced by increasing the average sine value $\sin\alpha_{ave}$.

The approximate straight line of the outer layer fiber unit 11B in the graph of FIG. 9 is represented by the following expression in which the average sine value $\sin\alpha_{ave}$ is represented by X and the increase amount of the loss is represented by Y.

$$Y = -0.228X + 0.233$$

Then, in the optical cable 1, it is desirable that the increase amount of the loss of the optical fiber 13 is reduced to 0.15 dB/km or less. Therefore, in the outer layer fiber unit 11B, the increase amount of the loss of the optical fiber 13 can be reduced to 0.15 dB/km or less by setting the average sine value $\sin\alpha_{ave}$ to 0.366 or less based on the above expression. That is, it is possible to reduce an increase in the transmission loss of the optical fiber 13 in the outer layer fiber unit 11B.

Further, in the optical fiber assembly 2 and the optical cable 1 according to one or more embodiments, the inner index is smaller than the outer index. Specifically, in the experimental examples shown in FIGS. 8 and 9, the average of the average sine value $\sin\alpha_{ave}$ of three inner layer fiber units 11A (the first to third optical fiber units 11) is 0.66, and the average of the average sine value $\sin\alpha_{ave}$ of nine outer layer fiber units 11B (the fourth to twelfth optical fiber units 11) is 0.79.

Thus, the inner layer fiber unit 11A can be disposed in a direction different from the outer layer fiber unit 11B. Specifically, as in the first disposition example shown in FIG. 5, the inner layer fiber unit 11A can be disposed such that the width direction of the optical fiber ribbon 12 configuring the inner layer fiber unit 11A is closer to the radial direction of the optical fiber assembly 2 than the width direction of the optical fiber ribbon 12 configuring the outer layer fiber unit 11B. Thus, it is easier to dispose the plurality of optical fiber units 11 without a gap in the internal space of the optical fiber assembly 2, as compared with a case where the inner layer fiber units 11A are disposed such that the width direction of the optical fiber ribbons 12 configuring the inner layer fiber units 11A faces the circumferential direction similar to the outer layer fiber units 11B, as in the second disposition example shown in FIG. 6. Therefore, it is possible to improve the utilization efficiency of the internal space of the optical fiber assembly 2 in which the plurality of optical fiber units 11 are disposed.

In addition, in the graph of FIG. 9, with reference to the approximate straight line of the inner layer fiber unit 11A, in the inner layer fiber unit 11A, the increase in the increase amount of the transmission loss decreases even when the average sine value $\sin\alpha_{ave}$ decreases. This is because the inner layer fiber unit 11A is located at the center of the optical fiber assembly 2 or in the vicinity of the center, and thus the expansion and contraction strain generated in the optical fiber 13 of the inner layer fiber unit 11A is reduced to be small in accordance with the bending of the optical cable 1. Therefore, by disposing the inner layer fiber unit 11A such that the average sine value $\sin\alpha_{ave}$ of the inner layer fiber unit 11A decreases, it is possible to improve the utilization efficiency of the internal space of the optical fiber assembly in which the plurality of optical fiber units are disposed, while reducing the increase in the transmission loss of the optical fiber 13 in the inner layer fiber unit 11A.

Further, in the optical fiber assembly 2 and the optical cable 1 according to one or more embodiments, since the stacked state of the plurality of optical fiber ribbons 12 in the optical fiber unit 11 is collapsed, the cross-sectional shape of the optical fiber unit 11 can be made different between the plurality of optical fiber units 11. Thus, the plurality of optical fiber units 11 can be easily disposed without any gap in the internal space of the optical fiber assembly 2. Therefore, it is possible to improve the utilization efficiency of the internal space of the optical fiber assembly 2 in which the plurality of optical fiber units 11 are disposed.

Further, in the optical fiber assembly 2 and the optical cable 1 according to one or more embodiments, the optical fiber ribbons 12 configuring the optical fiber unit 11 are meandering in the width direction. In this case, the degree of freedom of the relative movement of the plurality of optical fibers 13 configuring the same optical fiber ribbon 12 is larger than in a case in which the optical fiber ribbon 12 does not meander in the width direction. Thus, in a case where the optical fiber assembly 2 is bent or the like, the adjacent optical fibers 13 in the same optical fiber ribbon 12 can move so as to relax the bending stress acting on the optical fiber unit 11. Therefore, it is possible to reduce an increase in the transmission loss of the optical fiber 13.

Further, in the optical fiber assembly 2 and the optical cable 1 according to one or more embodiments, the optical fiber unit 11 is configured by stacking and bundling the plurality of optical fiber ribbons 12 with the line body 20. Therefore, it is possible to suppress or prevent the entire periphery of the optical fiber unit 11 (the plurality of optical fiber ribbons 12) from being covered as compared with a case where the plurality of optical fiber ribbons 12 are bundled with a tube. Therefore, as compared with a case where the optical fiber ribbons 12 are bundled with the tube, in a case where the optical fiber assembly 2 is bent or the like, the bundled plurality of optical fiber ribbons 12 or the optical fibers 13 configuring the optical fiber ribbons 12 can move freely. Thus, in a case where the optical fiber assembly 2 is bent or the like, the optical fiber ribbons 12 and the optical fibers 13 configuring the same optical fiber unit 11 can move with respect to each other so as to relax the bending stress acting on the optical fiber unit 11. Therefore, it is possible to reduce an increase in the transmission loss of the optical fiber 13.

Although the details of the present invention have been described above, the present invention is not limited to the above-described embodiments, and various modifications can be made without departing from the gist of the present invention.

In one or more embodiments of the present invention, the outer layer fiber unit 11B is not limited to being included only in the outermost peripheral fiber unit layer 10 (outermost peripheral layer 10B in FIGS. 5 and 6), and may be included in, for example, an outermost peripheral layer and one or a plurality of layers adjacent to each other on the inner side in the radial direction of the outermost peripheral layer. The fiber unit layer 10 including the outer layer fiber unit 11B may include, for example, the second inner layer 10A-2 in addition to the outer layer 10B in FIGS. 5 and 6. Further, in the above-described embodiments, the inner layer 10A is composed of two layers, but may be composed of one layer or three or more layers.

The present invention is not limited to being applied to the slotless type optical cable, and may be applied to, for example, a slotted optical cable having a slot rod. In this case, the optical fiber assembly may be housed in each slot. Even in a case where the optical fiber unit is divided into an inner layer and an outer layer in each slot, the same effect can be obtained by applying the relationship between the inner layer fiber unit and the outer layer fiber unit in the above-described embodiments.

REFERENCE SIGNS LIST

1: Optical cable
2: Optical fiber assembly
3: Outer sheath
10: Fiber unit layer
11: Optical fiber unit
11A: Inner layer fiber unit
11B: Outer layer fiber unit
12: Optical fiber ribbon
C: Center of optical fiber assembly 2
G: Center of gravity of optical fiber ribbon 12
R1: Radial direction straight line
W1: Ribbon width direction straight line
α: Angle

The invention claimed is:

1. An optical fiber assembly comprising:

by bundled optical fiber units, each of which is configured by stacking optical fiber ribbons, wherein a stacked state of the optical fiber ribbons in an optical fiber unit of the bundled optical fiber units is collapsed such that a ribbon surface of at least one of the optical fiber ribbons configuring the optical fiber unit is bent, in a cross section of the optical fiber assembly orthogonal to a longitudinal direction of the optical fiber assembly at least at a first position in the longitudinal direction, the bundled optical fiber units include inner layer fiber units located on an inner side in a radial direction of the optical fiber assembly, and outer layer fiber units located on an outer side in the radial direction of the optical fiber assembly relative to the inner layer fiber units, in a cross section of the optical fiber assembly orthogonal to the longitudinal direction, regarding a sine value sinα of an angle α formed by a radial direction straight line connecting a center of the optical fiber assembly and a center of gravity of an optical fiber ribbon of the optical fiber ribbons and a ribbon width direction straight line connecting both ends of the optical fiber ribbon whose enter of gravity is connected to the radial direction straight line, an average value of sine values sinα of the optical fiber ribbons in a same optical fiber unit is defined as an average sine value sinαave, and the average sine value $\sin\alpha_{ave}$ of an outer layer fiber unit of the outer layer fiber units is 0.366 or more, in a cross section of the optical fiber assembly orthogonal to the longitudinal direction at least at a second position in the longitudinal direction of the optical fiber assembly.

2. The optical fiber assembly according to claim 1, wherein the bundled optical fiber units are twisted in one direction or in an SZ manner, and the average sine value $\sin\alpha_{ave}$ of the outer layer fiber unit is 0.366 or more, in any cross sections within a range of each twist pitch.

3. The optical fiber assembly according to claim 1, wherein the average sine value $\sin\alpha_{ave}$ of the outer layer fiber unit is 0.366 or more, over the entire optical fiber assembly in the longitudinal direction.

4. The optical fiber assembly according to claim 1, wherein an average of the average sine values $\sin\alpha_{ave}$ of all the inner layer fiber units is smaller than an average of the average sine values $\sin\alpha_{ave}$ of all the outer layer fiber units, in a cross section of the optical fiber assembly orthogonal to the longitudinal direction at least at a third position in the longitudinal direction of the optical fiber assembly.

5. The optical fiber assembly according to claim 4, wherein the bundled optical fiber units are twisted in one direction or in an SZ manner, and an average of the average sine values $\sin\alpha_{ave}$ of the inner layer fiber units is smaller than an average of the average sine values $\sin\alpha_{ave}$ of the outer layer fiber units, in any cross sections within a range of each twist pitch.

6. The optical fiber assembly according to claim 4, wherein an average of the average sine values $\sin\alpha_{ave}$ of the inner layer fiber units is smaller than an average of the average sine values $\sin\alpha_{ave}$ of the outer layer fiber units, over the entire optical fiber assembly in the longitudinal direction.

7. The optical fiber assembly according to claim 1, wherein the optical fiber unit is bundled by a line body.

8. The optical fiber assembly according to claim 1, wherein the optical fiber unit having a thinnest thickness in the radial direction among all the bundled optical fiber units is the outer layer fiber unit located at an outermost periphery.

9. The optical fiber assembly according to claim 1, wherein the outer layer fiber unit is included in a layer located at least at an outermost periphery.

10. The optical fiber assembly according to claim 1, wherein the optical fiber ribbon is an intermittent connection type optical fiber ribbon.

11. An optical cable comprising:

the optical fiber assembly according to claim 1; and an outer sheath that covers the optical fiber assembly.

* * * * *